(12) United States Patent
Tang

(10) Patent No.: US 11,096,194 B2
(45) Date of Patent: Aug. 17, 2021

(54) METHOD OF ALLOCATING RESOURCE TO LOGICAL CHANNEL, TERMINAL APPARATUS, AND NETWORK APPARATUS

(71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 20 days.

(21) Appl. No.: 16/605,669

(22) PCT Filed: Apr. 25, 2017

(86) PCT No.: PCT/CN2017/081847
§ 371 (c)(1),
(2) Date: Oct. 16, 2019

(87) PCT Pub. No.: WO2018/195775
PCT Pub. Date: Nov. 1, 2018

(65) Prior Publication Data
US 2020/0137775 A1 Apr. 30, 2020

(51) Int. Cl.
*H04W 72/12* (2009.01)
*H04L 1/16* (2006.01)
(Continued)

(52) U.S. Cl.
CPC ....... *H04W 72/1242* (2013.01); *H04L 1/1642* (2013.01); *H04L 1/1819* (2013.01);
(Continued)

(58) Field of Classification Search
CPC ......... H04W 72/1242; H04W 28/0268; H04W 72/10; H04W 72/14; H04W 80/08;
(Continued)

(56) References Cited

U.S. PATENT DOCUMENTS

2012/0013748 A1* 1/2012 Stanwood ............... H04L 47/32
348/192
2016/0174243 A1 6/2016 Park et al.
(Continued)

FOREIGN PATENT DOCUMENTS

CN 102036390 A 4/2011
CN 102149146 A 8/2011
(Continued)

OTHER PUBLICATIONS

InterDigital Communications, LCP and Scheduling Aspects for Multiple Numerologies, 3GPP TSG-RAN WG2 NR Ad Hoc, Spokane, Washington Jan. 17-19, 2017, R2-1700236 (Year: 2017).*
(Continued)

*Primary Examiner* — Shailendra Kumar
(74) *Attorney, Agent, or Firm* — Young Basile Hanlon & MacFarlane, P.C.

(57) ABSTRACT

Embodiments of the present application relate to a method for allocating a resource to a logical channel, a terminal device and a network device. The method includes: receiving a first signaling sent by network device; determining a target PBR according to the first signaling; and determining a solution for allocating a granted resource to the logical channel according to the target PBR. According to the method for allocating the resource to the logical channel, the terminal device, and the network device in the embodiments of the present application, the terminal device determines the target PBR of the logical channel according to the signaling sent by the network device, so that the terminal device may allocate the granted resource to the logical channel according to the target PBR.

24 Claims, 3 Drawing Sheets

(51) Int. Cl.
*H04L 1/18* (2006.01)
*H04L 5/00* (2006.01)
*H04W 28/02* (2009.01)
*H04W 72/10* (2009.01)
*H04W 72/14* (2009.01)
*H04W 80/08* (2009.01)

(52) U.S. Cl.
CPC ....... *H04L 5/0082* (2013.01); *H04W 28/0268* (2013.01); *H04W 72/10* (2013.01); *H04W 72/14* (2013.01); *H04W 80/08* (2013.01)

(58) Field of Classification Search
CPC .... H04W 28/18; H04L 1/1642; H04L 1/1819; H04L 5/0082; H04L 1/1896
See application file for complete search history.

(56) References Cited

U.S. PATENT DOCUMENTS

| | | | |
|---|---|---|---|
| 2018/0054767 A1* | 2/2018 | Gholmieh | H04W 36/14 |
| 2018/0176937 A1* | 6/2018 | Chen | H04W 74/085 |

FOREIGN PATENT DOCUMENTS

| | | | | |
|---|---|---|---|---|
| CN | 103313411 A | 9/2013 | | |
| EP | 2922360 A1 * | 9/2015 | ............ | H04W 76/14 |
| EP | 2922360 A1 | 9/2015 | | |
| WO | 2015012557 A1 | 1/2015 | | |
| WO | WO-2015012557 A1 * | 1/2015 | ............ | H04W 72/14 |

OTHER PUBLICATIONS

Panasonic, Scheduling request procedure for D2D communication, 3GPP TSG RAN WG2 Meeting #96, Reno, Nevada, Nov. 14-18, 2016, R2-167797 (Year: 2016).*
3GPP TSG-RAN WG2 NR Ad Hoc R2-1700236; LCP and Scheduling Aspects for Multiple Numerologies; Spokane, Washington Jan. 17-19, 2017; pp. 1-3.
3GPP TSG RAN WG2 Meeting #96 R2-167797; Uplink scheduling procedure when supporting multiple numerologies; Reno, Nevada, Nov. 14-18, 2016; pp. 1-3.
Extended European Search Report for European Application No. 17907950.4 dated Mar. 11, 2020.
Communication pursuant to Article 94(3) EPC Examination for EP Application 17907950.4 dated Nov. 20, 2020.
Communication pursuant to Article 94(3) EPC for EP Application 17907950.4 dated Apr. 19, 2021. (6 pages).
India Examination Report for IN Application 201917044909 dated Feb. 24, 2021. (6 pages).
Japanese Office Action with English Translation for JP Application 2019-556327 dated May 21, 2021. (6 pages).
CMCC, HARQ Entity over Multiple Numerologies, 3GPP TSG-RAN WG2 Meeting#97, R2-1701927, Feb. 13-17, 2017. (3 pages).

* cited by examiner

METHOD OF ALLOCATING RESOURCE TO LOGICAL CHANNEL, TERMINAL APPARATUS, AND NETWORK APPARATUS

CROSS-REFERENCE TO RELATED APPLICATION(S)

The present application is a 371 application of International Application No. PCT/CN2017/081847, filed on Apr. 25, 2017, the disclosure of which is hereby incorporated by reference in its entirety.

TECHNICAL FIELD

The present application relates to a field of communication, in particular, to a method for allocating a resource to a logical channel, a terminal device and a network device.

BACKGROUND

In an LTE system, according to a logical channel priority (LCP), Radio Resource Control (RRC) configures three parameters: a priority, a Priority Bit Rate (PBR) and a Bucket Size Duration (BSD) for each Logical Channel (LC) in a process for allocating resources to different logical channels, and Media Access Control (MAC) determines an order in which each logical channel obtains a resource according to the three parameters.

Specifically, the priority determines an order of scheduling data for a logical channel, the greater the parameter of priority, the lower the priority level. The PBR determines a size of resource allocation for each scheduled logical channel, and the PBR and the BSD decide an upper limit of resources that may be scheduled for each logical channel. In addition to the three parameters configured by the RRC, an MAC entity also maintains a variable Bj for each logical channel, Bj is initialized to 0, and incremented with an increase of a Transmission Time Interval (TTI), an increment each time is a product PBR*TTI and an upper limit of Bj is a product PBR*BSD.

An LTE MAC protocol specifies a logical channel prioritization procedure. When a User Equipment (UE) obtains an uplink resource grant, the UE will allocate granted resources to different logical channels according to the specified logical channel prioritization procedure. The procedure mainly consists of the following acts.

In a first act, all logical channels with Bj>0 are sorted according to priorities, thereby a resource of PBR*TTI is allocated to each logical channel according to a descending order of priorities. If a PBR of a logical channel is set to infinity by the RRC, the MAC entity will allocate sufficient resources to the logical channel before serving other logical channels with lower priorities so that all data of the logical channel are completely scheduled.

In a second act, the MAC entity updates Bj, and decreases Bj by a total size of served Radio Link Control (RLC) Protocol Data Units (PDUs) of the corresponding logical channel.

In a third act, after the first act is performed, if any granted resource remains, all logical channels (regardless of the size of Bj) are sorted according to priorities and scheduled in turn. For each logical channel, a next logical channel will not be served until all data of the logical channel are completely scheduled or all remaining granted resources are exhausted.

At present, in 5G NR technology, a preliminary consensus has been reached on a logical channel prioritization procedure, that is, the LTE logical channel prioritization procedure is used as a baseline. However, in NR, as different resources are supported and a variety of different numerologies are used, this procedure may have some problems. For example, for two logical channels with a great difference in Quality of Service (QoS), such as a logical channel corresponding to a Ultra-reliable and Low Latency communications (URLLC) scenario and a logical channel corresponding to an Enhanced Mobile Broad Band (eMBB) scenario, when both of the logical channels are mapped to a numerology, such as logical channels corresponding to a short TTI, according to an LTE sorting criterion of logical channels, it may occur that after data of a size of PBR*TTI of the URLLC logical channel is scheduled, remaining resources are scheduled to data corresponding to the eMBB logical channel, which will lead to that data latency of the URLLC logical channel is not satisfied.

SUMMARY

The present application provides a method for allocating a resource to a logical channel, and a terminal device and a network device.

In a first aspect, a method for allocating a resource to a logical channel is provided. The method includes: receiving a first signaling sent by a network device; determining a target PBR according to the first signaling; and determining a solution for allocating a granted resource to a logical channel according to the target PBR.

Therefore, in the method for allocating a resource to a logical channel according to an implementation of the present application, the terminal device determines a target PBR of the logical channel according to a signaling sent by the network device, so that the terminal device may allocate a granted resource to the logical channel according to the target PBR.

In combination with the first aspect, in an implementation of the first aspect, the method further includes: determining multiple priority bit rates (PBRs) of the logical channel, wherein determining the target PBR according to the first signaling includes: determining the target PBR among the multiple PBRs according to the first signaling.

In combination with the first aspect and the above implementation, in another implementation of the first aspect, determining the target PBR among the multiple PBRs according to the first signaling includes: determining the target PBR according to indication information when determining that the first signaling includes the indication information, wherein the indication information is used for indicating the target PBR; and determining a default PBR among the multiple PBRs as the target PBR when determining that the first signaling does not include the indication information.

In combination with the first aspect and the above implementations, in another implementation of the first aspect, the multiple PBRs correspond to multiple numerologies one by one, and the method further includes: determining a target numerology corresponding to the target PBR according to a corresponding relationship between the multiple PBRs and the multiple numerologies, and transmitting data carried on the granted resource according to the target numerology.

In combination with the first aspect and the above implementations, in another implementation of the first aspect, the multiple PBRs correspond to multiple transmission time intervals (TTIs) one by one, and the method further includes: determining a target TTI corresponding to the target PBR according to a corresponding relationship between the multiple PBRs and the multiple TTIs, and transmitting data carried on the granted resource according to the target TTI.

In combination with the first aspect and the above implementations, in another implementation of the first aspect, the indication information is an index corresponding to the target PBR.

The terminal device determines a PBR corresponding to the index as the target PBR according to the index in the first signaling.

In combination with the first aspect and the above implementations, in another implementation of the first aspect, the indication information is an index of the target numerology.

The terminal device determines the corresponding target numerology according to the index in the first signaling, and then determines a PBR corresponding to the target numerology as the target PBR according to the corresponding relationship between the numerologies and the PBRs.

In combination with the first aspect and the above implementations, in another implementation of the first aspect, the indication information is the target TTI.

The terminal device determines the target TTI according to the indication information in the first signaling, and then determines a PBR corresponding to the target TTI as the target PBR according to the corresponding relationship between the TTIs and the PBRs.

In combination with the first aspect and the above implementations, in another implementation of the first aspect, the indication information is a hybrid automatic repeat request (HARQ) process number, and the HARQ process number corresponds to the target numerology.

The terminal device determines the target numerology according to the HARQ process number in the first signaling, and then determines a PBR corresponding to the target numerology as the target PBR according to the corresponding relationship between the numerologies and the PBRs.

In combination with the first aspect and the above implementations, in another implementation of the first aspect, the method further includes: receiving a second signaling sent by the network device, wherein the second signaling is used for instructing to adjust the target PBR; and setting the target PBR to infinity according to the second signaling.

Specifically, if the terminal device sets the target PBR of the logical channel to infinity according to the second signaling, for the logical channel, granted resources may be allocated according to an existing LCP sorting criterion. If there are sufficient granted resources, the terminal device will completely schedule data of the logical channel.

In combination with the first aspect and the above implementations, in another implementation of the first aspect, the method further includes: receiving a third signaling sent by the network device, wherein the third signaling is used for instructing to adjust a variable Bj of the logical channel, and the Bj represents a quantity of tokens available in a token bucket corresponding to the logical channel; and setting the Bj to be less than or equal to 0 according to the third signaling; wherein determining the solution for allocating the granted resource to the logical channel according to the target PBR includes: determining the solution for allocating the granted resource to the logical channel according to the target PBR and the Bj.

The terminal device may change a value of Bj of the logical channel according to the third signaling. For example, the value of the Bj may be adjusted to 0, then not any resource will be allocated to the logical channel corresponding to the Bj in the first act of granted resource allocation, while the granted resource will be allocated to other logical channels with a value of Bj greater than 0 in the first act of granted resource allocation.

In combination with the first aspect and the above implementations, in another implementation of the first aspect, wherein determining the multiple PBRs of the logical channel includes: receiving an upper layer signaling sent by the network device, wherein the upper layer signaling is used for indicating the multiple PBRs; and determining the multiple PBRs according to the upper layer signaling.

In combination with the first aspect and the above implementations, in another implementation of the first aspect, the method further includes: determining a priority of the logical channel and a bucket size duration (BSD) of the logical channel; wherein determining the solution for allocating the granted resource to the logical channel according to the target PBR includes: determining the solution for allocating the granted resource to the logical channel according to the target PBR, the priority, and the BSD.

Therefore, in the method for allocating a resource to a logical channel according to an implementation of the present application, the network device sends a signaling to the terminal device, so that the terminal device may determine a target PBR of the logical channel according to the signaling, and correspondingly, it may further determine a target numerology and a target TTI, and the terminal device may allocate a granted resource to the logical channel according to the target PBR, the target numerology and the target TTI. For example, different PBRs are respectively configured for a logical channel corresponding to the URLLC and a logical channel corresponding to the eMBB.

In a second aspect, a method for allocating a resource to a logical channel is provided. The method includes: determining a first signaling, wherein the first signaling is used for a terminal device to determine a target priority bit rate (PBR) of a logical channel, and the target PBR is used for the terminal device to determine a solution for allocating a granted resource to the logical channel; and sending the first signaling to the terminal device.

Therefore, in the method for allocating a resource to a logical channel according to an implementation of the present application, the network device sends a signaling to the terminal device, so that the terminal device determines a target PBR for the logical channel according to the signaling, and allocates a granted resource to the logical channel according to the target PBR.

In combination with the second aspect, in an implementation of the second aspect, before the first signaling is sent to the terminal device, the method further includes: sending an upper layer signaling to the terminal device, wherein the upper layer signaling is used for indicating multiple PBRs of the logical channel, and the first signaling is used for the terminal device to determine a target PBR among the multiple PBRs.

In combination with the second aspect and the above implementation, in another implementation of the second aspect, the first signaling includes indication information, and the indication information is used for indicating the target PBR.

In combination with the second aspect and the above implementations, in another implementation of the second aspect, wherein the multiple PBRs correspond to multiple numerologies one by one, and the target PBR corresponds to a target numerology.

In combination with the second aspect and the above implementations, in another implementation of the second aspect, wherein the multiple PBRs correspond to multiple transmission time intervals (TTIs) one by one, and the target PBR corresponds to a target TTI.

In combination with the second aspect and the above implementations, in another implementation of the second aspect, the indication information is an index corresponding to the target PBR.

In combination with the second aspect and the above implementations, in another implementation of the second aspect, the indication information is an index of the target numerology.

In combination with the second aspect and the above implementations, in another implementation of the second aspect, the indication information is the target TTI.

In combination with the second aspect and the above implementations, in another implementation of the second aspect, the indication information is a hybrid automatic repeat request (HARQ) process number, and the HARQ process number corresponds to the target numerology.

In combination with the second aspect and the above implementations, in another implementation of the second aspect, the method further includes: sending a second signaling to the terminal device, wherein the second signaling is used for instructing the terminal device to set the target PBR to infinity.

In combination with the second aspect and the above implementations, in another implementation of the second aspect, the method further includes: sending a third signaling to the terminal device, wherein the third signaling is used for instructing the terminal device to set a variable Bj of the logical channel to less than or equal to 0, the Bj representing a quantity of tokens available in a token bucket corresponding to the logical channel.

In a third aspect, a terminal device is provided. The terminal device is used for performing the method in the above first aspect or any possible implementation of the first aspect. Specifically, the terminal device includes units for performing the method in the above first aspect or any possible implementation of the above first aspect.

In a fourth aspect, a network device is provided. The network device is used for performing the method in the above second aspect or any possible implementation of the second aspect. Specifically, the network device includes units used for performing the method in the above second aspect or any possible implementation of the above second aspect.

In a fifth aspect, a terminal device is provided. The terminal device includes a memory and a processor, the memory is used for storing instructions, the processor is used for executing the instructions stored in the memory, and when the processor executes the instructions stored in the memory, the execution causes the processor to perform the method in the first aspect or any possible implementation of the first aspect.

In a sixth aspect, a network device is provided. The network device includes a memory and a processor, the memory is used for storing instructions, the processor is used for executing the instructions stored in the memory, and when the processor executes the instructions stored in the memory, the execution causes the processor to perform the method in the second aspect or any possible implementation of the second aspect.

In a seventh aspect, a computer readable medium is provided, which is used for storing a computer program, the computer program includes instructions for performing the method in the first aspect or any possible implementation of the first aspect.

In an eighth aspect, a computer readable medium is provided, which is used for storing a computer program, and the computer program includes instructions for performing the method in the second aspect or any possible implementation of the second aspect.

DETAILED DESCRIPTION

Hereinafter, technical solutions in implementations of the present application will be described with reference to accompanying drawings.

The technical solutions of implementations of the present application may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS) or a Worldwide Interoperability for Microwave Access (WiMAX) communication system, a future Fifth-Generation (5G) system, etc.

Various implementations are described in connection with a terminal device in the present application. The terminal device may also refer to a User Equipment (UE), an access terminal, a subscriber unit, a subscriber station, a mobile station, a mobile site, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, an vehicle-mounted device, a wearable device, a terminal device in a future 5G network, or a terminal device in a future evolving Public Land Mobile Network (PLMN), or the like.

Various implementations are described in connection with a network device in the present application. The network device may be a device for communicating with a terminal device, such as a Base Transceiver Station (BTS) in a GSM system or a CDMA system, a NodeB (NB) in a WCDMA system, or an Evolutional Node B (eNB or eNodeB) in an LTE system, or the network device may be a relay station, an access point, a vehicle-mounted device, a wearable device, a network side device in a future 5G network, or a network side device in a future evolved PLMN network, etc.

Figure 1:
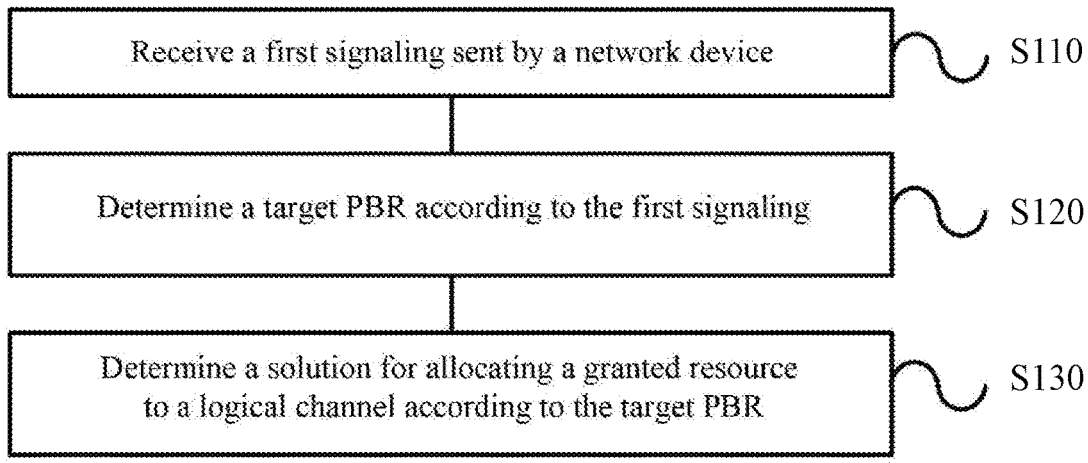
FIG. 1 is a schematic flowchart of a method for allocating a resource to a logical channel according to an implementation of the present application.

FIG. 1 shows a schematic flowchart of a method 100 for allocating a resource to a logical channel according to an implementation of the present application. Specifically, the method 100 may be performed by a terminal device, and as shown in FIG. 1, the method 100 includes S110, S120, and S130.

In S110, a first signaling sent by a network device is received.

In S120, a target PBR is determined according to the first signaling.

In S130, a solution for allocating a granted resource to a logical channel is determined according to the target PBR.

For services such as the URLLC and the eMBB with a great difference in QoS, corresponding resources may use different types of numerologies. Thus a PBR may be dynamically configured for a logical channel according to resources corresponding to different types of services.

Specifically, the terminal device receives the first signaling sent by the network device, and the first signaling is used for the terminal device to determine the target PBR. The terminal device may detect the first signaling, and when the first signaling includes indication information which is used for indicating the target PBR, the terminal device determines the target PBR according to the indication information; when the first signaling does not include the indication information, the terminal device determines a default PBR as the target PBR. Optionally, the terminal device may determine multiple PBRs for each logical channel according to an upper layer signaling sent by the network device, wherein the multiple PBRs may further correspond to multiple numerologies one by one, and the multiple PBRs may further correspond to multiple TTIs one by one. The terminal device receives the first signaling sent by the network device, and according to the first signaling, the terminal device determines the target PBR among the multiple PBRs. Then the terminal device determines the target PBR according to the first signaling, and correspondingly, the terminal device may further determine a target numerology corresponding to the target PBR, and a target TTI corresponding to the target PBR. The terminal device receives a granted resource allocated by the network device, and according to the determined target PBR, the terminal device may further determine a solution for allocating the granted resource to the logical channel according to the target numerology and the target TTI.

Therefore, in the method for allocating a resource to a logical channel according to an implementation of the present application, the terminal device determines a target PBR for the logical channel according to a signaling sent by the network device, so that the terminal device may allocate a granted resource to the logical channel according to the target PBR, thereby realizing dynamic adjustment of a priority of the logical channel and meeting different service requirements.

In S110, the terminal device receives the first signaling sent by the network device, which is used for the terminal device to determine the target PBR. Optionally, the first signaling may be any signaling of the first layer (the Physical Layer) or of the second layer (the Medium Access Control layer). For example, the first signaling may be Downlink Control Information (DCI). Specifically, the terminal device may detect the first signaling, and when the first signaling includes indication information that is used for indicating the target PBR, the terminal determines the target PBR according to the indication information, and when the first signaling does not include the indication information, the terminal device sets a default PBR as the target PBR.

In an implementation of the present application, the terminal device may determine one or more PBRs for the logical channel. For example, the terminal device may receive an upper layer signaling sent by the network device and determine the one or more PBRs for the logical channel. If the terminal device determines one PBR for the logical channel, the terminal device may determine the target PBR according to the first signaling and change the PBR of the logical channel to be the target PBR. Specifically, if the first signaling includes indication information, the terminal device determines the target PBR according to the indication information; if the first signaling does not include the indication information, the terminal device determines a default PBR as the target PBR.

In an implementation of the present application, the terminal device may configure multiple PBRs for the logical channel. For example, the terminal device may receive an upper layer signaling sent by the network device and determine multiple PBRs for the logical channel. Optionally, the multiple PBRs may correspond to multiple numerologies one by one, and the multiple PBRs may also correspond to multiple TTIs one by one. Accordingly, the terminal device determines the target PBR, the target PBR corresponds to the target numerology, and the target PBR may further correspond to the target TTI. The terminal device may transmit data carried on the granted resource according to the target numerology and the target TTI. For example, the target numerology may specify physical layer parameters of the granted resource, etc.

Optionally, multiple PBRs of the logical channel correspond to multiple numerologies one by one, wherein, in the corresponding relationship, equal PBR values may correspond to unequal numerologies, or equal numerologies may correspond to unequal PBR values. Similarly, equal PBR values may correspond to unequal TTI values, and equal TTI values may correspond to unequal PBR values, and implementations of the present application are not limited thereto.

For example, as shown in Table 1 below, a terminal device determines multiple PBRs for any one logical channel. Correspondingly, the terminal device may further configure numerologies and TTIs corresponding to the multiple PBRs one by one for the logical channel. The terminal device may further set a default PBR in the multiple PBRs. For example, as shown in Table 1, a PBR in the first row equal to 500 bits/ms is a default PBR, and correspondingly, a default numerology is 15 KHz and a default TTI is 1 ms. Optionally, as shown in Table 1, the first column may be indexes corresponding to multiple PBRs, or indexes of numerologies. That is, according to an index in the first column, a PBR value, and corresponding numerology and TTI may be uniquely determined.

TABLE 1

| Parameter Set | | | |
|---|---|---|---|
| Index | PBR | Numerology | TTI |
| 1 (Default) | 500 bits/ms | 15 KHz | 1 ms |
| 2 | 700 bits/ms | 30 KHz | 0.5 ms |
| 3 | 1000 bits/ms | 60 KHz | 0.25 ms |
| 4 | infinity | 120 KHz | 0.125 ms |

Specifically, the network device may allocate corresponding granted resources to the terminal device according to different service requirements, and for different granted resources, the terminal device may dynamically adjust a relevant parameter for the logical channel, For example, the terminal device may determine a PBR of the logical channel according to a signaling sent by the network device.

Optionally, the terminal device may determine a target PBR among the multiple PBRs according to indication information in the first signaling, and the indication information may be an index of the target PBR, that is, a PBR corresponding to the index may be determined as the target PBR. For example, as shown in Table 1, a first column may represent indexes of PBRs, and when the indication information is index 3, the terminal device may determine that the target PBR is 1000 bits/ms, and correspondingly, it may further determine that the target numerology is 60 KHz and the target TTI is 0.25 ms.

Optionally, the indication information may be an index of the target numerology, that is, a numerology corresponding to the index may be determined as the target numerology. Then a PBR corresponding to the target numerology may be determined as the target PBR according to a corresponding relationship between numerologies and PBRs, and a TTI corresponding to the target PBR may further be determined as the target TTI according to a corresponding relationship between PBRs and TTIs. For example, as shown in Table 1, the first column may represent indexes of numerologies, and when the indication information is index 2, the terminal device may determine that the target PBR is 700 bits/ms, and correspondingly, it may further determine the target numerology is 30 KHz and the target TTI is 0.5 ms.

Optionally, the indication information may be a TTI, that is, the terminal device may determine the target TTI according to the indication information. Then according to a corresponding relationship between TTIs and PBRs, it may determine a PBR corresponding to the target TTI as the target PBR, and according to a corresponding relationship between PBRs and numerologies, it may further determine a numerology corresponding to the target PBR as the target numerology. For example, if the indication information is a TTI equal to 0.5 ms, correspondingly, the target PBR may be determined to be 700 bits/ms, and the target numerology may further be determined to be 30 KHz.

Optionally, the indication information may be a Hybrid Automatic Repeat reQuest (HARQ) process number, and there is a corresponding relationship between the HARQ process number and a numerology. Then the terminal device may determine a corresponding numerology as the target numerology according to a HARQ process number included in the first signaling. Furthermore, according to a corresponding relationship between the target numerology and a PBR, the terminal device may determine the PBR corresponding to the target numerology as the target PBR, and according to a corresponding relationship between PBRs and TTIs, the terminal device may further determine a TTI corresponding to the target PBR as the target TTI.

In S120, the terminal device determines a target PBR according to the first signaling.

Specifically, the terminal device detects the first signaling, and when the first signaling includes indication information, the terminal device determines a PBR indicated by the indication information as the target PBR; when the first signaling does not include indication information, the terminal device determines a default PBR as the target PBR.

Optionally, the terminal device may further change a determined target PBR. Specifically, the terminal device receives a second signaling sent by the network device, and the second signaling is used for instructing the terminal device to adjust the target PBR. When the terminal device receives the second signaling, the terminal may set the target PBR to infinity, and then according to the changed target PBR, such as the target PBR which is set to infinity, the terminal may determine a solution for allocating a resource to the logical channel. Optionally, the second signaling may be any signaling of the first layer (the Physical Layer) or of the second layer (the Medium Access Control layer).

For example, for a PBR of a logical channel corresponding to the URLLC, the network device instructs the terminal device to set the PBR of the logical channel to infinity through the second signaling. Then according to an existing LCP sorting criterion, if there are sufficient granted resources, the terminal device will schedule data of the logical channel completely, thus meeting requirements such as latency of URLLC type services.

For another example, the terminal device may receive a second signaling sent by the network device, and change a target PBR of a logical channel to infinity according to a preset rule in the second signaling. For example, the preset rule is that, for a logical channel carrying a video service and containing an I-frame of the video service, the target PBR of the logical channel may be set to infinity.

An I-frame is an intra-coded frame, also known as intra picture. An I-frame is usually a first frame of each GOP (a video compression technology used by Moving Picture Experts Group (MPEG)), which, after appropriate compression, is used as a reference point for random access and may be regarded as an image. An I-frame may be regarded as a product after compression of an image, and may be decompressed into a separate complete picture by a video decompression algorithm.

In addition, there is a P-frame, a forward predictive coded frame, also called a predictive-frame. A P-frame is a coded frame which compresses the data amount to be transmitted by taking into consideration of temporal redundancy information of a previous coded frame in an image sequence, and it needs to refer to a previous I-frame or B-frame to generate a complete picture. A B-frame is a bi-directional predictive interpolation coded frame, also called as a bi-directional interpolated prediction frame. A B-frame is a coded frame which takes into account not only temporal redundancy information between the coded frame and a previous coded frame in a source image sequence, but also temporal redundancy information between the coded frame and a coded frame thereafter in the source image sequence to compress the data amount to be transmitted. The B-frame is also called a bi-directional predictive frame.

Specifically, since the I-frame contains more information than a P/B-frame, a wireless transmission system should give the I-frame a higher transmission priority. However, as the three frames belong to a same radio bearer, and the I-frame and the P/B-frame are processed by a same Packet Data Convergence Protocol (PDCP) entity, the prior art does not distinguish different frame types in a packet loss processing mechanism. Whereas, in an implementation of the present application, when the terminal device determines that a logical channel contains an I-frame of a video service according to the second signaling, the terminal device may set the target PBR of the logical channel to infinity.

Optionally, the terminal device may change another relevant parameter of a logical channel in other ways. For example, the terminal device may further receive a third signaling sent by the network device, and the third signaling is used for instructing the terminal device to adjust a variable Bj of a logical channel. The Bj may represent a quantity of tokens available in a token bucket corresponding to the logical channel. That is, an MAC entity may maintain a variable Bj for the logical channel. The Bj is initially set to 0, and increases with an increment of a TTI, and an increment of Bj each time is a product PBR*TTI, and an upper limit value of Bj is a product PBR*BSD. The terminal device adjusts the Bj corresponding to the logical channel to a value less than or equal to 0 according to the third signaling sent by the network device. Then according to an existing LCP sorting criterion, a granted resource is allocated only to a logical channel with Bj greater than zero in a first round of resource allocation. Optionally, the third signaling may be any signaling of the first layer (the Physical Layer) or of the second layer (the Medium Access Control layer).

For example, Bj of a logical channel corresponding to the eMBB may be adjusted. For example, the Bj may be adjusted to 0, and then not any resource will be allocated to the logical channel corresponding to the Bj in the first act of granted resource allocation. Correspondingly, a resource will be allocated to a logical channel corresponding to the URLLC in the first act of granted resource allocation, thus meeting requirements such as latency of URLLC type services.

For another example, the terminal device may receive a third signaling sent by the network device, and change a value of Bj of a logical channel according to a preset rule in the third signaling. For example, the preset rule is: for a logical channel including an I-frame of a video service and a logical channel including a P/B-frame of the video service, the terminal device may set Bj of the logical channel corresponding to the P/B-frame to be less than or equal to 0, and accordingly, the granted resource will be limitedly allocated to the logical channel corresponding to the I-frame.

In S130, the terminal device determines a solution for allocating the granted resource to the logical channel according to the target PBR. Specifically, the terminal device determines the target PBR for the logical channel, and may further determine a priority and a BSD of the logical channel, wherein the priority may decide an order of scheduling data in the logical channel, the greater the value of the priority, the lower the priority level, and a product PBR*BSD decides an upper limit of resources that may be scheduled for each logical channel. For example, similar to a configuration procedure of the LTE in the prior art, according to an upper layer signaling sent by the network device, the terminal device may determine the priority and the BSD of the logical channel. In addition, the terminal device may further determine a target numerology and a target TTI.

The terminal device may allocate the granted resource to the logical channel according to the target PBR, the priority and the BSD of the logical channel, or according to the target numerology and the target TTI, or according to Bj of the logical channel. For example, the terminal device may, according to a traditional LTE LCP sorting procedure, perform logical channel scheduling, and allocate the granted resource to the logical channel, and implementations of the present application are not limited thereto.

Therefore, in the method for allocating a resource to a logical channel according to an implementation of the present application, the network device sends a signaling to the terminal device, so that the terminal device may determine a target PBR for the logical channel according to the signaling, and correspondingly, the terminal device may further determine a target numerology and a target TTI, so that the terminal device allocates a granted resource to the logical channel according to the target PBR, the target numerology and the target TTI. Thereby, dynamically adjusting the priority of the logical channel is realized. For example, different PBRs are respectively configured for a logical channel corresponding to the URLLC and a logical channel corresponding to the eMBB, thereby meeting different service requirements.

Figure 2:
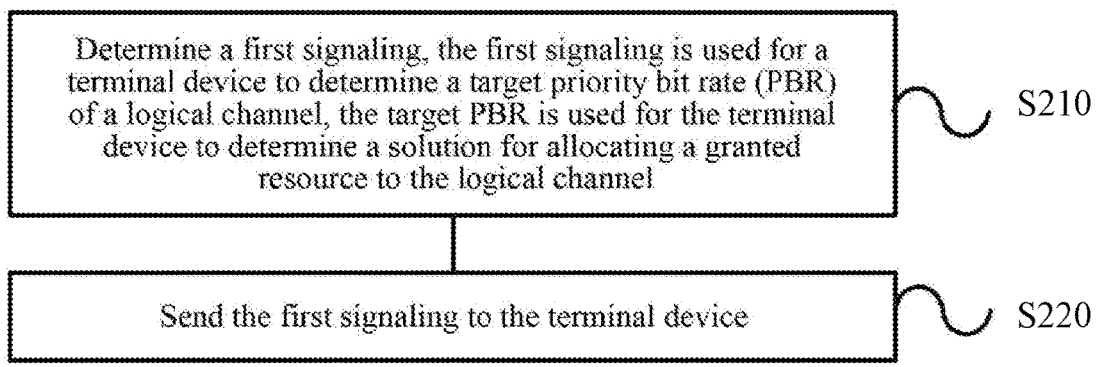
FIG. 2 is another schematic flowchart of a method for allocating a resource to a logical channel according to an implementation of the present application.

FIG. 2 shows a schematic flowchart of a method 200 for allocating a resource to a logical channel according to an implementation of the present application, and the method 200 may be performed by a network device. Specifically, as shown in FIG. 2, the method 200 includes S210 and S220.

In S210, a first signaling is determined, the first signaling is used for a terminal device to determine a target priority bit rate (PBR) of a logical channel, and the target PBR is used for the terminal device to determine a solution for allocating a granted resource to the logical channel.

In S220, the first signaling is sent to the terminal device.

Therefore, in the method for allocating a resource to a logical channel according to an implementation of the present application, the network device sends a signaling to the terminal device, so that the terminal device determines a target PBR of the logical channel according to the signaling, and allocates a granted resource to the logical channel according to the target PBR, thereby realizing dynamic adjustment of a priority of the logical channel and meeting different service requirements.

Optionally, before sending the first signaling to the terminal device, the method further includes: sending an upper layer signaling to the terminal device, the upper layer signaling is used for indicating multiple PBRs of the logical channel, and the first signaling is used for the terminal device to determine the target PBR among the multiple PBRs.

Optionally, the first signaling includes indication information, and the indication information is used for indicating the target PBR.

Optionally, the multiple PBRs correspond to multiple numerologies one by one, and the target PBR corresponds to a target numerology.

Optionally, the multiple PBRs correspond to multiple transmission time intervals (TTIs) one by one, and the target PBR corresponds to a target TTI.

Optionally, the indication information is an index corresponding to the target PBR.

Optionally, the indication information is an index of the target numerology.

Optionally, the indication information is the target TTI.

Optionally, the indication information is a Hybrid Automatic Repeat reQuest (HARQ) process number, and the HARQ process number corresponds to the target numerology.

Optionally, the method further includes: sending a second signaling to the terminal device, and the second signaling is used for instructing the terminal device to set the target PBR to infinity.

Specifically, the second signaling may include a preset rule, and the preset rule may be: for a logical channel including an I-frame, the terminal device sets a target PBR of the logical channel to infinity.

Optionally, the method further includes: sending a third signaling to the terminal device, the third signaling is used for instructing the terminal device to set a variable Bj of the logical channel to less than or equal to 0, and the Bj represents a quantity of tokens available in a token bucket corresponding to the logical channel.

Specifically, the third signaling may include a preset rule, and the preset rule may be: for a logical channel including an I-frame and a logical channel including a B/P-frame, the terminal device may set a value of Bj of the logical channel including the B/P-frame to be less than or equal to 0.

It should be understood that the network device in the implementation of the present application corresponds to the network device in the method 100, and the method corresponding to the network device in the method 100 may be performed correspondingly, which will not be repeated here.

Therefore, in the method for allocating a resource to a logical channel according to an implementation of the present application, the network device sends a signaling to the terminal device, and the signaling is used for instructing the terminal device to determine a target PBR of the logical channel according to the signaling, so that the terminal device may allocate a granted resource to the logical channels according to the target PBR, thereby realizing dynamic adjustment of the priority of the logical channel and meeting different service requirements.

It should be understood that in various implementations of the present application, the sizes of numbers of the various processes do not imply an order of execution of the various processes, the order of execution of the various processes should be determined by their functions and internal logics, and this should not constitute any limitation on implementation processes of the implementations of the present application.

A method for allocating a resource to a logical channel according to an implementation of the present application is described in detail above with reference to FIG. 1 and FIG. 2. Devices for allocating a resource to a logical channel according to an implementation of the present application will be described in detail below with reference to FIG. 3 to FIG. 6.

Figure 3:
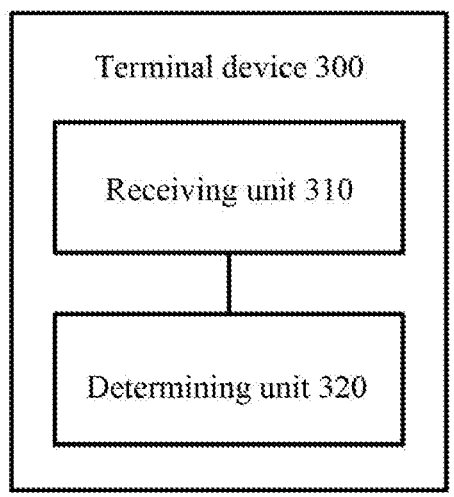
FIG. 3 is a schematic block diagram of a terminal device according to an implementation of the present application.

FIG. 3 illustrates a terminal device 300 provided by an implementation of the present application. The terminal device 300 includes a receiving unit 310 and a determining unit 320.

The receiving unit 310 is used for receiving a first signaling sent by a network device.

The determining unit 320 is used for determining a target PBR according to the first signaling.

The determining unit 320 is further used for determining a solution for allocating a granted resource to the logical channel according to the target PBR.

Therefore, a terminal device of an implementation of the present application receives a signaling sent by a network device, and determines a target PBR of a logical channel according to the signaling, so that the terminal device may allocate a granted resource to the logical channel according to the target PBR, thereby realizing dynamic adjustment of a priority of the logical channel and meeting different service requirements.

Optionally, the determining unit 320 is further used for: determining multiple priority bit rates (PBRs) of the logical channel, and determining the target PBR among the multiple PBRs according to the first signaling.

Optionally, the determining unit 320 is specifically used for: determining the target PBR according to indication information when determining that the first signaling includes the indication information, wherein the indication information is used for indicating the target PBR; and determining a default PBR among the multiple PBRs as the target PBR when determining that that the first signaling does not include the indication information.

Optionally, the multiple PBRs correspond to multiple numerologies one by one, and the determining unit 320 is further used for: determining a target numerology corresponding to the target PBR according to a corresponding relationship between the multiple PBRs and the multiple numerologies, and transmitting data carried on the granted resource according to the target numerology.

Optionally, the multiple PBRs correspond to multiple transmission time intervals (TTIs) one by one, and the determining unit 320 is further used for: determining a target TTI corresponding to the target PBR according to a corresponding relationship between the multiple PBRs and the multiple TTIs, and transmitting data carried on the granted resource according to the target TTI.

Optionally, the indication information is an index corresponding to the target PBR.

Optionally, the indication information is an index of the target numerology.

Optionally, the indication information is the target TTI.

Optionally, the indication information is a Hybrid Automatic Repeat reQuest (HARQ) process number, and the HARQ process number corresponds to the target numerology.

Optionally, the receiving unit 310 is further used for: receiving a second signaling sent by the network device, and the second signaling is used for instructing to adjust the target PBR; and the determining unit 320 is further used for: setting the target PBR to infinity according to the second signaling.

Optionally, the receiving unit 310 is further used for: receiving a third signaling sent by the network device, the third signaling is used for instructing to adjust a variable Bj of the logical channel, and the Bj represents a quantity of tokens available in a token bucket corresponding to the logical channel; and the determining unit 320 is further used for: setting the Bj to less than or equal to 0 according to the third signaling, and determining a solution for allocating the granted resource to the logical channel according to the target PBR and the Bj.

Optionally, the determining unit 320 is specifically used for: receiving an upper layer signaling sent by the network device, wherein the upper layer signaling is used for indicating the multiple PBRs, and determining the multiple PBRs according to the upper layer signaling.

Optionally, the determining unit 320 is further used for: determining a priority of the logical channel and a bucket size duration (BSD) of the logical channel, and determining a solution for allocating the granted resource to the logical channel according to the target PBR, the priority and the BSD.

It should be understood that the terminal device 300 according to the implementation of the present application may correspondingly perform the method 100 in the implementation of the present application, and the above and other operations and/or functions of various units in the terminal device 300 are respectively for realizing corresponding flows of the method in FIG. 1, and will not be repeated here for the sake of conciseness.

Therefore, the terminal device of an implementation of the present application receives a signaling sent by the network device, and determines a target PBR of a logical channel according to the signaling, and the terminal device may further determine a target numerology and a target TTI correspondingly, so that the terminal device may allocate a granted resource to the logical channel according to the target PBR, the target numerology and the target TTI, thereby realizing dynamic adjustment of the priority of the logical channel. For example, different PBRs are respectively configured for a logical channel corresponding to the URLLC and a logical channel corresponding to the eMBB, thereby satisfying different service requirements.

Figure 4:
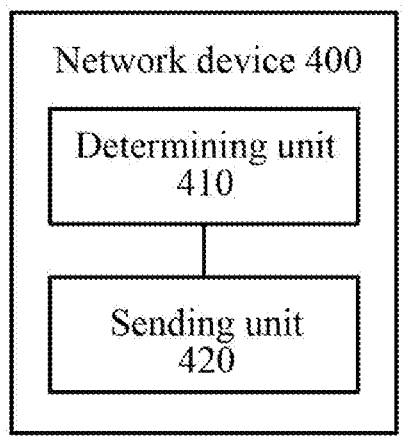
FIG. 4 is a schematic block diagram of a network device according to an implementation of the present application.

FIG. 4 illustrates a network device 400 provided by an implementation of the present application, the network device 400 includes a determining unit 410 and a sending unit 420.

The determining unit 410 is used for determining a first signaling, the first signaling is used for a terminal device to determine a target priority bit rate (PBR) of a logical channel, and the target PBR is used for the terminal device to determine a solution for allocating a granted resource to the logical channel.

The sending unit 420 is used for sending the first signaling to the terminal device.

Therefore, the network device of an implementation of the present application sends a signaling to the terminal device, so that the terminal device determines a target PBR of a logical channel according to the signaling, and may allocate a granted resource to the logical channel according to the target PBR, thereby realizing dynamic adjustment of a priority of the logical channel and meeting different service requirements.

Optionally, the sending unit 420 is further used for: sending an upper layer signaling to the terminal device before the first signaling is sent to the terminal device, the upper layer signaling is used for indicating multiple PBRs of the logical channel, and the first signaling is used for the terminal device to determine the target PBR among the multiple PBRs.

Optionally, the first signaling includes indication information, and the indication information is used for indicating the target PBR.

Optionally, the multiple PBRs correspond to multiple numerologies one by one, and the target PBR corresponds to a target numerology.

Optionally, the multiple PBRs correspond to multiple transmission time intervals (TTIs) one by one, and the target PBR corresponds to a target TTI.

Optionally, the indication information is an index corresponding to the target PBR.

Optionally, the indication information is an index of the target numerology.

Optionally, the indication information is the target TTI.

Optionally, the indication information is a Hybrid Automatic Repeat reQuest (HARQ) process number, and the HARQ process number corresponds to the target numerology.

Optionally, the sending unit 420 is further used for: sending a second signaling to the terminal device, the second signaling is used for instructing the terminal device to set the target PBR to infinity.

Optionally, the sending unit 420 is further used for sending a third signaling to the terminal device, the third signaling is used for instructing the terminal device to set a variable Bj of the logical channel to be less than or equal to 0, and the Bj represents a quantity of tokens available in a token bucket corresponding to the logical channel.

It should be understood that the terminal device 400 according to the implementation of the present application may correspondingly perform the method 200 in the implementation of the present application, and the above and other operations and/or functions of various units in the terminal device 400 are respectively for realizing corresponding flows of the method in FIG. 2, which will not be repeated here for the sake of conciseness.

Therefore, the network device of an implementation of the present application sends a signaling to the terminal device, so that the terminal device may determine a target PBR of a logical channel according to the signaling, and further determine a target numerology and a target TTI correspondingly, thus the terminal device may allocate a granted resource to the logical channel according to the target PBR, the target numerology, and the target TTI, thereby realizing dynamic adjustment of the priority of the logical channel. For example, different PBRs are respectively configured for a logical channel corresponding to the URLLC and a logical channel corresponding to the eMBB, thereby meeting different service requirements.

Figure 5:
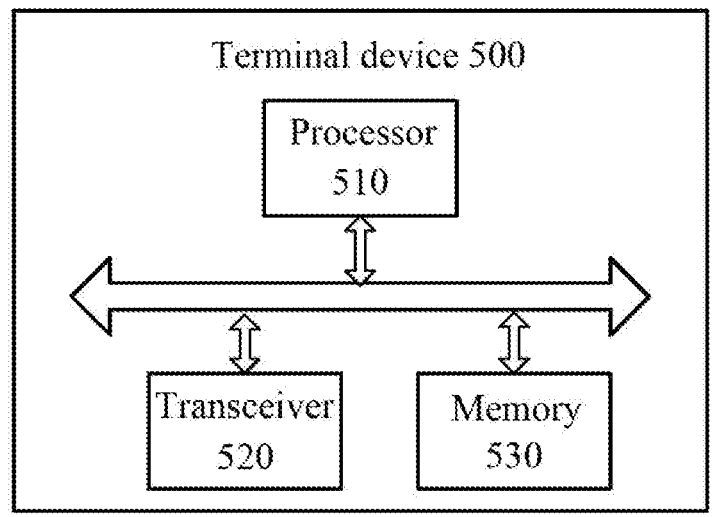
FIG. 5 is another schematic block diagram of a terminal device according to an implementation of the present application.

FIG. 5 illustrates a schematic block diagram of a terminal device 500 according to an implementation of the present application. As illustrated in FIG. 5, the terminal device 500 includes: a processor 510 and a transceiver 520, the processor 510 is connected to the transceiver 520. Optionally, the terminal device 500 further includes a memory 530, and the memory 530 is connected to the processor 510. The processor 510, the memory 530 and the transceiver 520 communicate with each other through an internal connection path to transfer control and/or data signals. The memory 530 may be used for storing instructions. The processor 510 is used for executing the instructions stored in the memory 530 to control the transceiver 520 to send information or signals. The transceiver 520 is used for receiving a first signaling sent by a network device. The processor 510 is used for determining a target PBR according to the first signaling, and determining a solution for allocating a granted resource to a logical channel according to the target PBR.

Therefore, the terminal device of an implementation of the present application receives a signaling sent by the network device, and determines a target PBR of a logical channel according to the signaling, so that the terminal device may allocate a granted resource to the logical channel according to the target PBR, thereby realizing dynamic adjustment of a priority of the logical channel and meeting different service requirements.

Optionally, the processor 510 is further used for: determining multiple priority bit rates (PBRs) of the logical channel, and determining the target PBR among the multiple PBRs according to the first signaling.

Optionally, the processor 510 is specifically used for: determining the target PBR according to indication information when determining that the first signaling includes the indication information, wherein the indication information is used for indicating the target PBR, and determining a default PBR among the multiple PBRs as the target PBR when determining that the first signaling does not include the indication information.

Optionally, the multiple PBRs correspond to multiple numerologies one by one, and the processor 510 is further used for: determining a target numerology corresponding to the target PBR according to a corresponding relationship between the multiple PBRs and the multiple numerologies, and transmitting data carried on the granted resource according to the target numerology.

Optionally, the multiple PBRs correspond to multiple transmission time intervals (TTIs) one by one, and the processor 510 is further used for: determining a target TTI corresponding to the target PBR according to a corresponding relationship between the multiple PBRs and the multiple TTIs, and transmitting data carried on the granted resource according to the target TTI.

Optionally, the indication information is an index corresponding to the target PBR.

Optionally, the indication information is an index of the target numerology.

Optionally, the indication information is the target TTI.

Optionally, the indication information is a Hybrid Automatic Repeat reQuest (HARQ) process number, and the HARQ process number corresponds to the target numerology.

Optionally, the transceiver 520 is further used for: receiving a second signaling sent by the network device, the second signaling is used for instructing to adjust the target PBR, and the processor 510 is further used for: setting the target PBR to infinity according to the second signaling.

Optionally, the transceiver 520 is further used for: receiving a third signaling sent by the network device, the third signaling is used for instructing to adjust a variable Bj of the logical channel, and the Bj represents a quantity of tokens available in a token bucket corresponding to the logical channel. The processor 510 is further used for: setting the Bj to less than or equal to 0 according to the third signaling, and determining the solution for allocating the granted resource to the logical channel according to the target PBR and the Bj.

Optionally, the processor 510 is specifically used for: receiving an upper layer signaling sent by the network device, wherein the upper layer signaling is used for indicating multiple PBRs; and determining the multiple PBRs according to the upper layer signaling.

Optionally, the processor 510 is further used for: determining a priority of the logical channel and a bucket size duration (BSD) of the logical channel, and determining the solution for allocating the granted resource to the logical channel according to the target PBR, the priority and the BSD.

It should be understood that the terminal device 500 according to the implementation of the present application may correspond to the terminal device 300 in the implementation of the present application and may correspond to a corresponding body that performs the method 100 according to the implementation of the present application, and the above and other operations and/or functions of various units in the terminal device 500 are respectively for initiating corresponding flows for devices in various methods shown in FIG. 1, and will not be repeated here for the sake of conciseness.

Therefore, the terminal device of an implementation of the present application receives a signaling sent by the network device, and determines a target PBR of a logical channel according to the signaling, and may further determine a target numerology and a target TTI correspondingly, so that the terminal device may allocate a granted resource to the logical channel according to the target PBR, the target numerology and the target TTI, thereby realizing dynamic adjustment of the priority of the logical channel. For example, different PBRs are respectively configured for a logical channel corresponding to the URLLC and a logical channel corresponding to the eMBB, thereby satisfying different service requirements.

Figure 6:
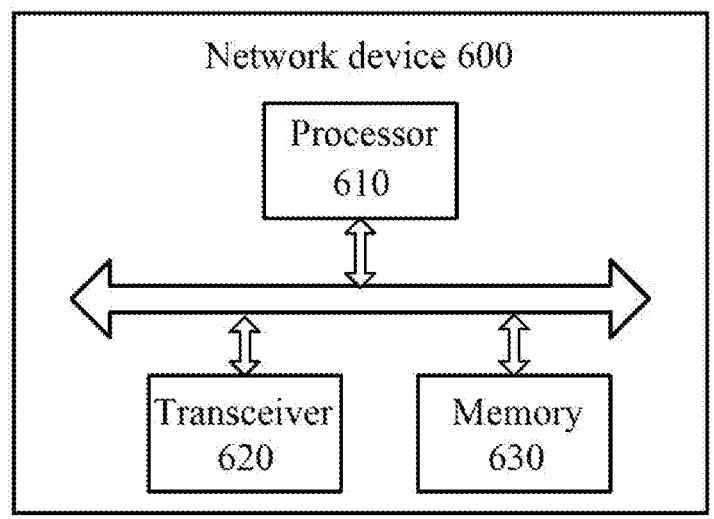
FIG. 6 is another schematic block diagram of a network device according to an implementation of the present application.

FIG. 6 illustrates a schematic block diagram of a network device 600 according to an implementation of the present application. As illustrated in FIG. 6, the network device 600 includes: a processor 610 and a transceiver 620, the processor 610 is connected to the transceiver 620. Optionally, the network device 600 further includes a memory 630, the memory 630 is connected to the processor 610. The processor 610, the memory 630 and the transceiver 620 communicate with each other through an internal connection path to transfer control and/or data signals. The memory 630 may be used for storing instructions. The processor 610 is used for executing the instructions stored in the memory 630 to control the transceiver 620 to send information or signals. The processor 610 is used for determining a first signaling, the first signaling is used for a terminal device to determine a target priority bit rate (PBR) of a logical channel, and the target PBR is used for the terminal device to determine a solution for allocating a granted resource to the logical channel. The transceiver 620 is used for sending the first signaling to the terminal device.

Therefore, the network device of an implementation of the present application sends a signaling to the terminal device, so that the terminal device determines a target PBR of a logical channel according to the signaling, and the terminal device further allocates a granted resource to the logical channel according to the target PBR, thereby realizing dynamic adjustment of a priority of the logical channel and meeting different service requirements.

Optionally, the transceiver 620 is further used for: sending an upper layer signaling to the terminal device before the first signaling is sent to the terminal device, the upper layer signaling is used for indicating multiple PBRs of the logical channel, and the first signaling is used for the terminal device to determine the target PBR among the multiple PBRs.

Optionally, the first signaling includes indication information, and the indication information is used for indicating the target PBR.

Optionally, the multiple PBRs correspond to multiple numerologies one by one, and the target PBR corresponds to a target numerology.

Optionally, the multiple PBRs correspond to multiple transmission time intervals (TTIs) one by one, and the target PBR corresponds to a target TTI.

Optionally, the indication information is an index corresponding to the target PBR.

Optionally, the indication information is an index of the target numerology.

Optionally, the indication information is the target TTI.

Optionally, the indication information is a Hybrid Automatic Repeat reQuest (HARQ) process number, and the HARQ process number corresponds to the target numerology.

Optionally, the transceiver 620 is further used for sending a second signaling to the terminal device, the second signaling is used for instructing the terminal device to set the target PBR to infinity.

Optionally, the transceiver 620 is further used for sending a third signaling to the terminal device, the third signaling is used for instructing the terminal device to set a variable Bj of the logical channel to be less than or equal to 0, and the Bj represents a quantity of tokens available in a token bucket corresponding to the logical channel.

It should be understood that the terminal device 600 according to the implementation of the present application may correspond to the terminal device 400 in the implementation of the present application and may correspond to a corresponding body that performs the method 200 according to the implementation of the present application, and the above and other operations and/or functions of various units in the terminal device 600 are respectively for initiating corresponding flows for devices in various methods shown in FIG. 2, and will not be repeated here for the sake of conciseness.

Therefore, the network device of an implementation of the present application sends a signaling to the terminal device, so that the terminal device may determine a target PBR of a logical channel according to the signaling, and correspondingly, the terminal device may further determine a target numerology and a target TTI, and allocate a granted resource to the logical channel according to the target PBR, the target numerology and the target TTI, thereby realizing dynamic adjustment of the priority of the logical channel. For example, different PBRs are respectively configured for a logical channel corresponding to the URLLC and a logical channel corresponding to the eMBB, thereby meeting different service requirements.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present application.

Those skilled in the art can clearly understand that for convenience and conciseness of description, the specific working processes of the system, apparatus and unit described above may refer to the corresponding processes in the aforementioned method implementations and will not be described here.

In several implementations provided by the present application, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations In addition, various functional units in various implementations of the present application may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present application. The storage medium includes various mediums capable of storing program codes such as U disk, mobile hard disk, read-only memory (ROM), random access memory (RAM), magnetic disk or optical disk.

What are described above are merely exemplary implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What I claim is:

1. A method for allocating a resource to a logical channel, comprising:
    determining a plurality of priority bit rates (PBRs) of the logical channel;
    receiving a first signaling sent by a network device;
    determining a target PBR among the plurality of PBRs according to the first signaling sent by the network device;
    determining a solution for allocating a granted resource to a logical channel according to the target PBR;
    receiving a second signaling sent by the network device, wherein the second signaling is used for instructing to adjust the target PBR; and
    setting the target PBR of a logical channel corresponding to a Ultra-reliable and Low Latency Communication (URLLC) service to infinity according to the second signaling,
    wherein determining the target PBR among the plurality of PBRs according to the first signaling sent by the network device comprises:
        determining the target PBR according to indication information when the first signaling sent by the network device is determined as comprising the indication information, wherein the indication information is used for indicating the target PBR; and
        determining a default PBR among the plurality of PBRs as the target PBR when the first signaling sent by the network device is determined as not comprising the indication information.

2. The method of claim 1, wherein the plurality of PBRs corresponds to a plurality of numerologies one by one, and the method further comprises:
    determining a target numerology corresponding to the target PBR according to a corresponding relationship between the plurality of PBRs and the plurality of numerologies; and
    transmitting data carried on the granted resource according to the target numerology.

3. The method of claim 2, wherein the indication information is an index of the target numerology.

4. The method of claim 2, wherein the indication information is a Hybrid Automatic Repeat reQuest (HARQ) process number, and the HARQ process number corresponds to the target numerology.

5. The method of claim 1, wherein the plurality of PBRs corresponds to a plurality of transmission time intervals (TTIs) one by one, and the method further comprises:
    determining a target TTI corresponding to the target PBR according to a corresponding relationship between the plurality of PBRs and the plurality of TTIs; and
    transmitting data carried on the granted resource according to the target TTI.

6. The method of claim 5, wherein the indication information is the target TTI.

7. The method of claim 1, wherein the indication information is an index corresponding to the target PBR.

8. The method of claim 1, wherein the method further comprises:
    receiving a third signaling sent by the network device, wherein the third signaling is used for instructing to adjust a variable Bj of the logical channel, and the Bj represents a quantity of tokens available in a token bucket corresponding to the logical channel; and setting the Bj to be less than or equal to 0 according to the third signaling;

wherein determining the solution for allocating the granted resource to the logical channel according to the target PBR comprises:

determining the solution for allocating the granted resource to the logical channel according to the target PBR and the Bj.

9. The method of claim 8, wherein the third signaling comprises a second preset rule, and the second preset rule comprises: for a logical channel comprising a B-frame or P-frame of a video service, a value of Bj of the logical channel is set to be less than or equal to 0.

10. The method of claim 1, wherein determining the plurality of PBRs of the logical channel comprises:

receiving an upper layer signaling sent by the network device, wherein the upper layer signaling is used for indicating the plurality of PBRs; and determining the plurality of PBRs according to the upper layer signaling.

11. The method of claim 1, wherein the method further comprises:

determining a priority of the logical channel and a bucket size duration (BSD) of the logical channel, wherein determining the solution for allocating the granted resource to the logical channel according to the target PBR comprises:

determining the solution for allocating the granted resource to the logical channel according to the target PBR, the priority, and the BSD.

12. The method of claim 1, wherein the second signaling comprises a first preset rule, and the first preset rule comprises: for a logical channel comprising an I-frame of a video service, a target PBR of the logical channel is set to infinity.

13. A terminal device, comprising a processor and a transceiver, wherein:

the transceiver is used for receiving a first signaling sent by a network device;

the processor is used for:

determining a plurality of priority bit rates (PBR) of the logical channel;

determining a target PBR among the plurality of PBRs according to the first signaling sent by the network device;

determining a solution for allocating a granted resource to a logical channel according to the target PBR;

determining the target PBR according to indication information when the first signaling sent by the network device is determined as comprising the indication information, wherein the indication information is used for indicating the target PBR; and determining a default PBR among the plurality of PBRs as the target PBR when the first signaling sent by the network device is determined as not comprising the indication information;

the transceiver is further used for receiving a second signaling sent by the network device, wherein the second signaling is used for instructing to adjust the target PBR; and the processor is further used for setting the target PBR of a logical channel corresponding to a Ultra-reliable and Low Latency Communication (URLLC) service to infinity according to the second signaling.

14. The terminal device of claim 13, wherein the plurality of PBRs corresponds to a plurality of numerologies one by one, and the processor is further used for:

determining a target numerology corresponding to the target PBR according to a corresponding relationship between the plurality of PBRs and the plurality of numerologies; and the transceiver is further used for:

transmitting data carried on the granted resource according to the target numerology.

15. The terminal device of claim 14, wherein the indication information is an index of the target numerology.

16. The terminal device of claim 14, wherein the indication information is a Hybrid Automatic Repeat reQuest (HARQ) process number, and the HARQ process number corresponds to the target numerology.

17. The terminal device of claim 13, wherein the plurality of PBRs corresponds to a plurality of transmission time intervals (TTIs) one by one, and the processor is further used for:

determining a target TTI corresponding to the target PBR according to a corresponding relationship between the plurality of PBRs and the plurality of TTIs; and the transceiver is further used for:

transmitting data carried on the granted resource according to the target TTI.

18. The terminal device of claim 17, wherein the indication information is the target TTI.

19. The terminal device of claim 13, wherein the indication information is an index corresponding to the target PBR.

20. The terminal device of claim 13, wherein the transceiver is further used for:

receiving a third signaling sent by the network device, wherein the third signaling is used for instructing to adjust a variable Bj of the logical channel, and the Bj represents a quantity of tokens available in a token bucket corresponding to the logical channel; and the processor is further used for:

setting the Bj to be less than or equal to 0 according to the third signaling; and determining the solution for allocating the granted resource to the logical channel according to the target PBR and the Bj.

21. The terminal device of claim 20, wherein the third signaling comprises a second preset rule, and the second preset rule comprises: for a logical channel comprising a B-frame or P-frame of a video service, a value of Bj of the logical channel is set to be less than or equal to 0.

22. The terminal device of claim 13, wherein the transceiver is further used for:

receiving an upper layer signaling sent by the network device, wherein the upper layer signaling is used for indicating the plurality of PBRs; and the processor is further used for:

determining the plurality of PBRs according to the upper layer signaling.

23. The terminal device of claim 13, wherein the processor is further used for:

determining a priority of the logical channel and a bucket size duration (BSD) of the logical channel; and determining the solution for allocating the granted resource to the logical channel according to the target PBR, the priority, and the BSD.

24. The terminal device of claim 13, wherein the second signaling comprises a first preset rule, and the first preset rule comprises: for a logical channel comprising an I-frame of a video service, a target PBR of the logical channel is set to infinity.

* * * * *